Feb. 19, 1935.  G. GWOZDECKI  1,992,068
SIGHTING DEVICE FOR CAMERAS
Filed Jan. 29, 1932   3 Sheets-Sheet 1
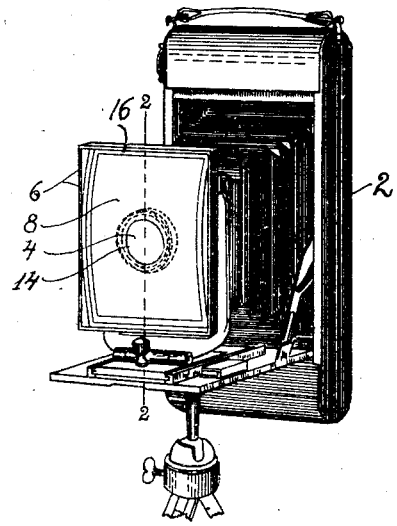
Fig.1.
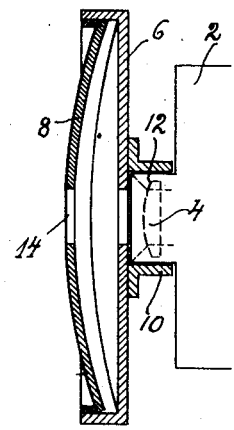
Fig.2.
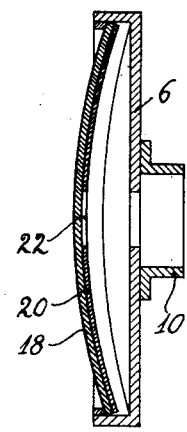
Fig.3.
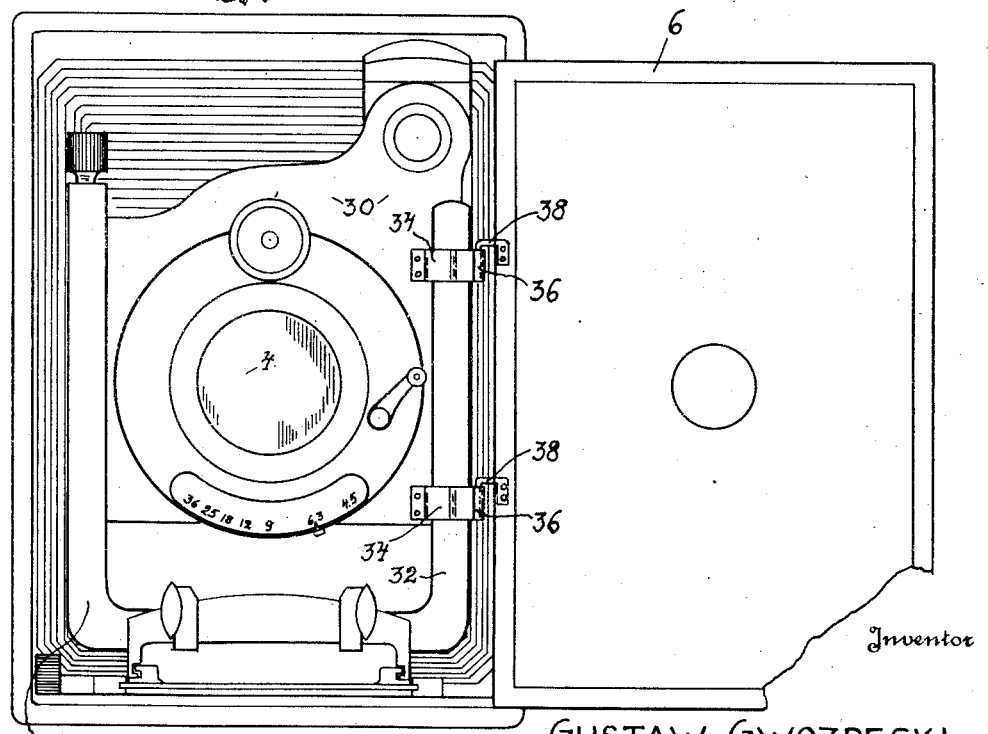
Fig.4.
Inventor
GUSTAW GWOZDECKI
By
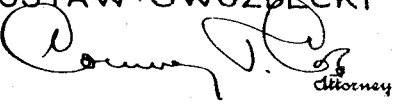
Attorney Feb. 19, 1935.　　G. GWOZDECKI　　1,992,068
SIGHTING DEVICE FOR CAMERAS
Filed Jan. 29, 1932　　3 Sheets-Sheet 2

Inventor
GUSTAW GWOZDECKI
By
Attorney

Feb. 19, 1935.  G. GWOZDECKI  1,992,068
SIGHTING DEVICE FOR CAMERAS
Filed Jan. 29, 1932  3 Sheets-Sheet 3
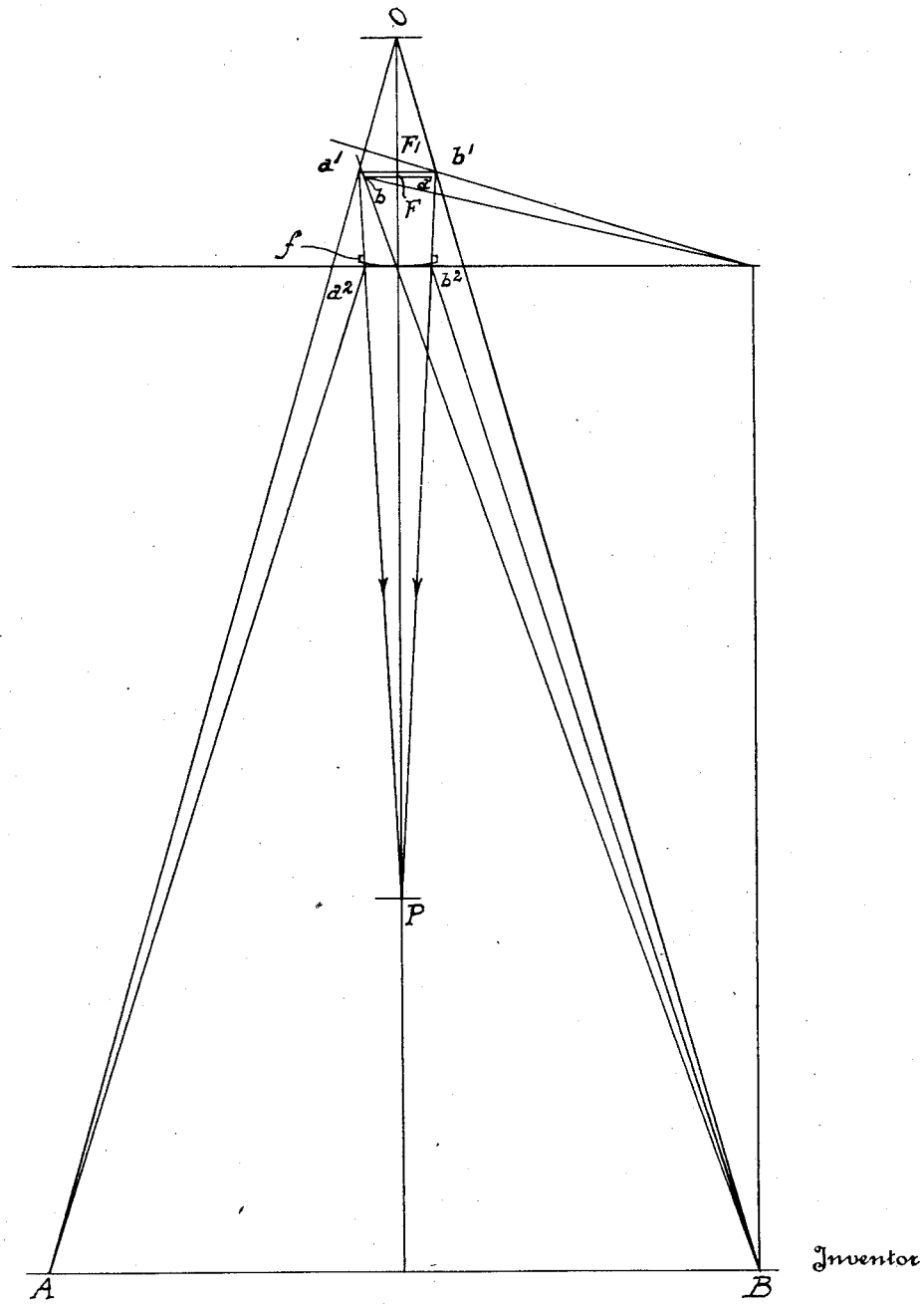
Fig. 8.  GUSTAW GWOZDECKI Patented Feb. 19, 1935

1,992,068

UNITED STATES PATENT OFFICE 1,992,068

SIGHTING DEVICE FOR CAMERAS

Gustaw Gwozdecki, Paris, France

Application January 29, 1932, Serial No. 589,741
In Belgium February 2, 1931

1 Claim. (Cl. 88—1)

My invention relates to photographic devices and more particularly to devices for sighting a photographic or cinematographic camera.

One of the chief difficulties in photography is that the photographer is often unable to be certain that he will so align his camera that the desired field will be received by the sensitive surface or to determine how the finished picture will look. It is quite easy to set the camera to one side of the correct line so that the resulting picture is not at all what the operator intended. This difficulty also occurs when the photographer attempts to make a picture of himself. The primary purpose of my invention is to overcome this difficulty and to provide a device by which the user of a camera may be certain that he will get a properly centered and proportioned picture of any desired object.

In the past, two methods of lining up a camera have been in common use. In some cameras, particularly those using plates, a frame is provided within the camera of the same size as the plate located at the focus of the objective and holding a piece of ground glass which is only semi-transparent. The photographer places his head beneath a hood at the back of the camera so as to enlarge his pupils to enable him to see dim images and looks at the image formed on the glass by the objective. This image is of course inverted which makes the operation somewhat uncertain. In addition, only a small amount of light reaches the glass and the image is therefore dim. Such an arrangement is unsatisfactory for several reasons. First, the object to be photographed only appears faintly and in inverted condition and it requires practice to be able to identify objects and to determine the limits of the field of the camera. Second, the plate must be put in position after the camera is adjusted, and this action is likely to move the camera in some manner. This is particularly detrimental as there is no way of checking the setting of the camera after the plate is in place. The hood is cumbersome and inconvenient and is never very satisfactory.

In other cameras, a visor is used in which the field of the camera is supposedly reflected. Such devices are always very small and quite obviously no accuracy is possible when they are used. Visors are satisfactory enough when the camera is held in the hand and cannot be perfectly steady, but are wholly impractical in a tripod mounted or otherwise fixed camera.

The primary object of my invention is to provide a simple and inexpensive device for sighting a camera promptly, easily and exactly and for determining with accuracy how the finished photograph will look, even to its size and proportions.

A second object is to provide a device which can be seen from the front of the camera and which will form a clear, upright image visible from a considerable distance and representing the picture which will result. In this way, the photographer may make any desired changes before exposing the film or plate in the camera. For instance, he may rearrange objects to his own taste in any manner so as to get artistic effects. A group of persons may be properly positioned with respect to each other or to the background, or the pose of a single person may be changed.

The device is particularly useful for taking pictures of interiors, where space is limited, or in any situation where the camera is so located that it is impossible or inconvenient to stand behind the same. For example, in photographing the interior of a room, it is often desirable to place the camera against a wall or in a corner, in which case it is impossible with existing devices to set the camera properly. With the present invention, an exact adjustment of the camera can be obtained. If desired, the camera may even be arranged on a frame or the like outside a window to make a picture of the interior, which would be nearly impossible with prior devices for back sighting the camera.

A further object of the invention is to make it easy to take good photographs, particularly time exposures, with the popular and inexpensive roll film cameras which are not provided with the ground glass used in plate cameras.

In addition, my invention makes it easy for a person to make a photograph of himself by studying his pose in the mirror.

Finally, it is my object to provide a device of this type which requires no special skill but can be used by anyone. Also, I provide means whereby the arrangement can be easily mounted on or removed from a camera.

Other objects and advantages of the invention will appear more fully from the following description when taken in conjunction with the accompanying drawings which form a part thereof.

In the drawings:

Fig. 1 is a perspective view showing one form of the invention mounted on a camera in position for use.

Fig. 2 is a cross section on the line 2—2 of Fig. 1.

Fig. 3 is a cross section corresponding to Fig. 2 of a modified form of the invention.

Fig. 4 is a front elevation of a further modified form.

Fig. 8 is a graphic representation showing the path of light rays in a camera to which my invention is applied.

Figures 5, 7:
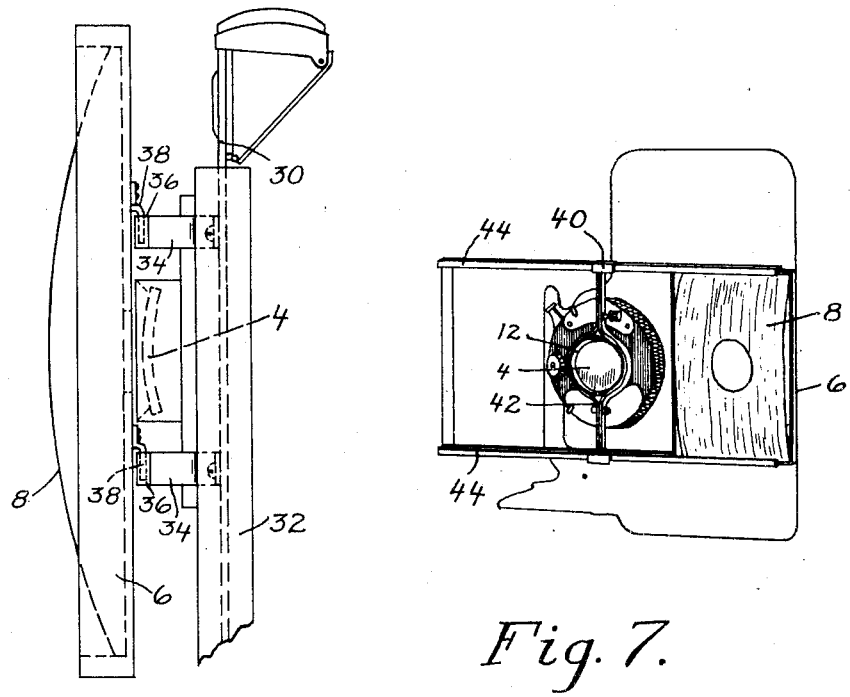
Fig. 5 is a side elevation of the same.
Fig. 7 is a perspective view of a still further modification.

The invention broadly comprises a convex mirror with means for mounting the mirror in front of the objective of a camera. An opening or transparent portion is provided in the mirror in front of the objective through which light rays may reach the objective when the picture is taken.

In Fig. 1, 2 represents a camera of any well known type having an objective lens 4. Mounted in front of the objective 4 is a frame 6 which supports a convex (for instance spherical) mirror 8 having its reflecting surface at the front, that is, on the side furthest from the objective 4. This mirror, in the form shown in Figs. 1 and 2, comprises a piece of any suitable metal having a polished surface. The back of the frame 6 is provided with a cap or flange 10 which fits slidably over a corresponding flange 12 around the objective 4. This flange 12 is provided in most cameras, but it is obvious that other means might well be employed to connect the frame rigidly to the objective so that the objective and mirror will move together.

The mirror is provided with an opening 14 at the center, and the mirror is so mounted that the axis of this central opening is aligned with the axis of the objective 4.

The frame 6 is of the same shape and preferably of the same size as the sensitive surface to be exposed, so that the mirror represents the sensitive surface. The radius of curvature of the mirror is such that the virtual image formed by the mirror will appear to the user in substantially the same dimensions as the real image formed by the objective. Where the frame 6 is of the same size as the sensitive surface to be exposed, this can be done by making the radius of curvature of the mirror equal to or slightly greater than twice the focal length of the objective. The image reflected in the mirror is therefore substantially the same as that which will upon exposure strike the sensitive surface.

Preferably, the mirror is such that, when seen from a standard distance, it will just cover the field of the objective. Obviously if the objective is set for greater distances its field will be smaller. In order to indicate the field at such increased distances, I provide on the surface of the mirror lines defining a plurality of smaller frames 16, preferably with indicia to denote the distances or settings which each of these frames represents. For instance, the portion of the image within one of the smaller frames will appear in the picture when the objective is set for a greater distance. The distances represented by each frame may be indicated by suitable indicia on the mirror.

To take a picture (Fig. 8) with the camera set for six feet, for example, the photographer first sights the camera approximately on the object AB. He then places himself in front of the camera as at P and looks into the mirror. When his own eyes are centered, that is, when he sees their image centrally with respect to the opening 14, he is aligned with the axes of the mirror and objective. The camera can then be moved or turned until the desired picture appears in the mirror.

Considering Fig. 8, wherein F is the focus of the objective and F' the focus of the mirror, the virtual image $a'b'$ will appear to be located, with respect to the frame $f$ of the mirror, at $a^2b^2$, just as the real image $a'b'$ is located on the sensitive surface to be exposed. The image appearing in the frame will then be the same as will appear on the picture with the camera as then adjusted. If the desired picture is not reflected in the mirror, the setting of the camera may be changed, or, if the picture is of a person or group, these may be directed to place themselves in proper positions. Also, the photographer may make an accurate picture of himself in this manner, since he may take any desired pose and judge of his own appearance and the setting of the camera.

The opening 14 is made as large as the working aperture which is slightly smaller than the objective so that a picture can be taken without removing the mirror from its position on the camera in front of the objective.

Fig. 3 shows a modified form of mirror which may be substituted for that shown in Fig. 2. This mirror comprises a spherical support 18 of glass on the rear face of which is a silver or other reflecting coating 20. This coating is omitted at the center of the mirror to form an opening 22 through which the picture is taken.

Figure 6:
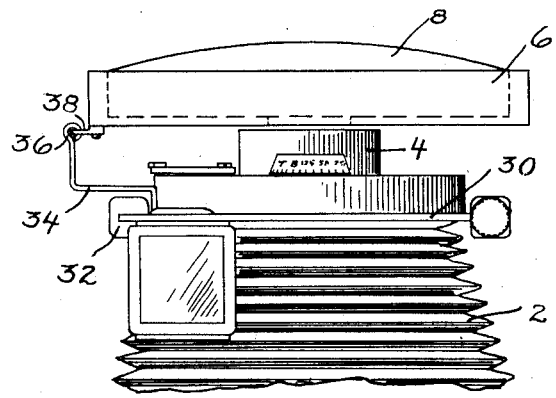
Fig. 6 is a top plan view of the same.

Figs. 4 to 6 show a second method of mounting the mirror on the camera. The objective 4 is mounted in the center of a plate 30 which is adjustable vertically and horizontally on a guide member or support 32. The objective extends in front of the plate 30 as seen in Figs. 5 and 6. Secured to the front of the plate 30 are hinge members 34 which are so shaped as to extend outwardly to a point in front of the plate of the objective and sidewise beyond the frame 32. At their outer ends these hinge members are provided with vertically disposed sockets 36. On the rear side of the mirror frame 6, and at one edge thereof, vertical hinge pins 38 are provided which engage in the sockets 36 so that the mirror is pivotally mounted on the camera in front of the objective. The mirror may be removed completely by merely lifting the pins 38 out of the sockets 36. Means may be provided if desired to latch the mirror in place in front of the objective.

Fig. 7 shows a further modification. A framework 40 is mounted by a clamping arrangement 42 on the flange 12 around the objective 4. The framework 40 carries upper and lower guides 44 in which the frame 6 is slidably mounted so that it may be moved in front of or out of the line of the objective.

While I have described herein some embodiments of my invention, it is quite evident that many modifications are possible without exceeding the scope thereof. I therefore wish it to be understood that I do not intend to limit myself by the description except within the scope of the appended claim.

I claim:

In combination with a camera provided with an objective, a finder assembly comprising a convex mirror having a central opening therein, means for supporting said mirror in front of said objective so that the optical axis of said objective passes through the center of said opening, said convex mirror having a curvature conforming to the equation $$R \geqq 2f$$

where R is the radius of curvature of the mirror and $f$ is the focal length of the objective, and a plurality of lines provided on the convex face of said mirror and closing spaces whose areas correspond to the true images obtained at varying distances from the objective.

GUSTAW GWOZDECKI.